US 9,625,264 B1

(12) United States Patent
Imanishi et al.

(10) Patent No.: US 9,625,264 B1
(45) Date of Patent: Apr. 18, 2017

(54) SYSTEMS AND METHODS FOR DISPLAYING ROUTE INFORMATION

(71) Applicant: DENSO CORPORATION, Kariya-shi, Aichi-ken (JP)

(72) Inventors: Masayuki Imanishi, Okazaki (JP); Syed Ali, West Bloomfield, MI (US)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/001,434

(22) Filed: Jan. 20, 2016

(51) Int. Cl.
    *G01C 21/30* (2006.01)
    *G05D 1/02* (2006.01)
    *G05D 1/00* (2006.01)
    *G01C 21/36* (2006.01)
    *G01C 21/28* (2006.01)

(52) U.S. Cl.
    CPC .............. *G01C 21/30* (2013.01); *G01C 21/28* (2013.01); *G01C 21/3602* (2013.01); *G01C 21/365* (2013.01); *G01C 21/3638* (2013.01); *G05D 1/0061* (2013.01); *G05D 1/0257* (2013.01)

(58) Field of Classification Search
    CPC .... G01C 21/30; G01C 21/28; G01C 21/3602; G01C 21/3638; G01C 21/365; G05D 1/0061; G05D 1/0257
    See application file for complete search history.

(56) References Cited

U.S. PATENT DOCUMENTS

| 5,291,414 | A  | * | 3/1994 | Tamai | ................ | G01C 21/3415 |
| | | | | | | 340/990 |
| 7,353,110 | B2 | * | 4/2008 | Kim | .................... | G01C 21/3644 |
| | | | | | | 340/995.1 |
| 8,676,430 | B1 | * | 3/2014 | Ferguson | ............. | G05D 1/0274 |
| | | | | | | 340/435 |
| 8,825,265 | B1 | * | 9/2014 | Ferguson | ............. | G05D 1/0212 |
| | | | | | | 701/23 |
| 9,494,439 | B1 | * | 11/2016 | Ross | ....................... | G01C 21/34 |
| 2007/0005609 | A1 | * | 1/2007 | Breed | .................. | B60N 2/2863 |
| 2009/0228204 | A1 | * | 9/2009 | Zavoli | ..................... | G01C 21/30 |
| | | | | | | 701/532 |
| 2012/0259546 | A1 | | 10/2012 | Kim | | |
| 2014/0156182 | A1 | | 6/2014 | Nemec et al. | | |
| 2015/0292891 | A1 | * | 10/2015 | Kojo | ..................... | G01C 21/30 |
| | | | | | | 701/446 |

FOREIGN PATENT DOCUMENTS

| JP | 2000305625 A | 11/2000 |
| JP | 2006078635 A | 3/2006 |
| WO | WO-201115405 A1 | 12/2011 |

* cited by examiner

Primary Examiner — Michael J Zanelli
(74) Attorney, Agent, or Firm — Harness, Dickey & Pierce, P.L.C.

(57) ABSTRACT

A method for displaying route information to a driver of a vehicle. The method includes comparing map data and a physical environment in which the vehicle is traveling, identifying differences between the map data and the physical environment in which the vehicle is traveling, and notifying the driver of the differences between the map data and the physical environment.

19 Claims, 4 Drawing Sheets

SYSTEMS AND METHODS FOR DISPLAYING ROUTE INFORMATION

FIELD

The present disclosure relates to systems and methods for displaying route information.

BACKGROUND

This section provides background information related to the present disclosure, which is not necessarily prior art.

Automobiles and other vehicles often include mapping and route guidance systems, and are being increasingly outfitted with autonomous driving systems, which drive and direct the vehicle based on the map data. While existing mapping and route guidance systems are suitable for their intended use, they are subject to improvement. For example, existing mapping and route guidance systems lack feedback systems for informing the driver when the environment in which the vehicle is traveling differs from the map data being used to guide the vehicle. As a result, the driver may not be comfortable having his or her vehicle autonomously driven, and/or relying on map data that may be out of date and not account for current driving conditions. The present teachings provide for systems and methods for displaying route information to a driver that address these and other shortcomings with current systems and methods.

SUMMARY

This section provides a general summary of the disclosure, and is not a comprehensive disclosure of its full scope or all of its features.

The present teachings are directed to methods and systems for displaying route information to a driver of a vehicle. For example, a comparison of map data and a physical environment in which the vehicle is traveling is displayed to the driver of the vehicle. Differences between the map data and the physical environment in which the vehicle is traveling can be identified, which will allow the driver to respond to any differences between the environment and the map data, as well as respond to current driving conditions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
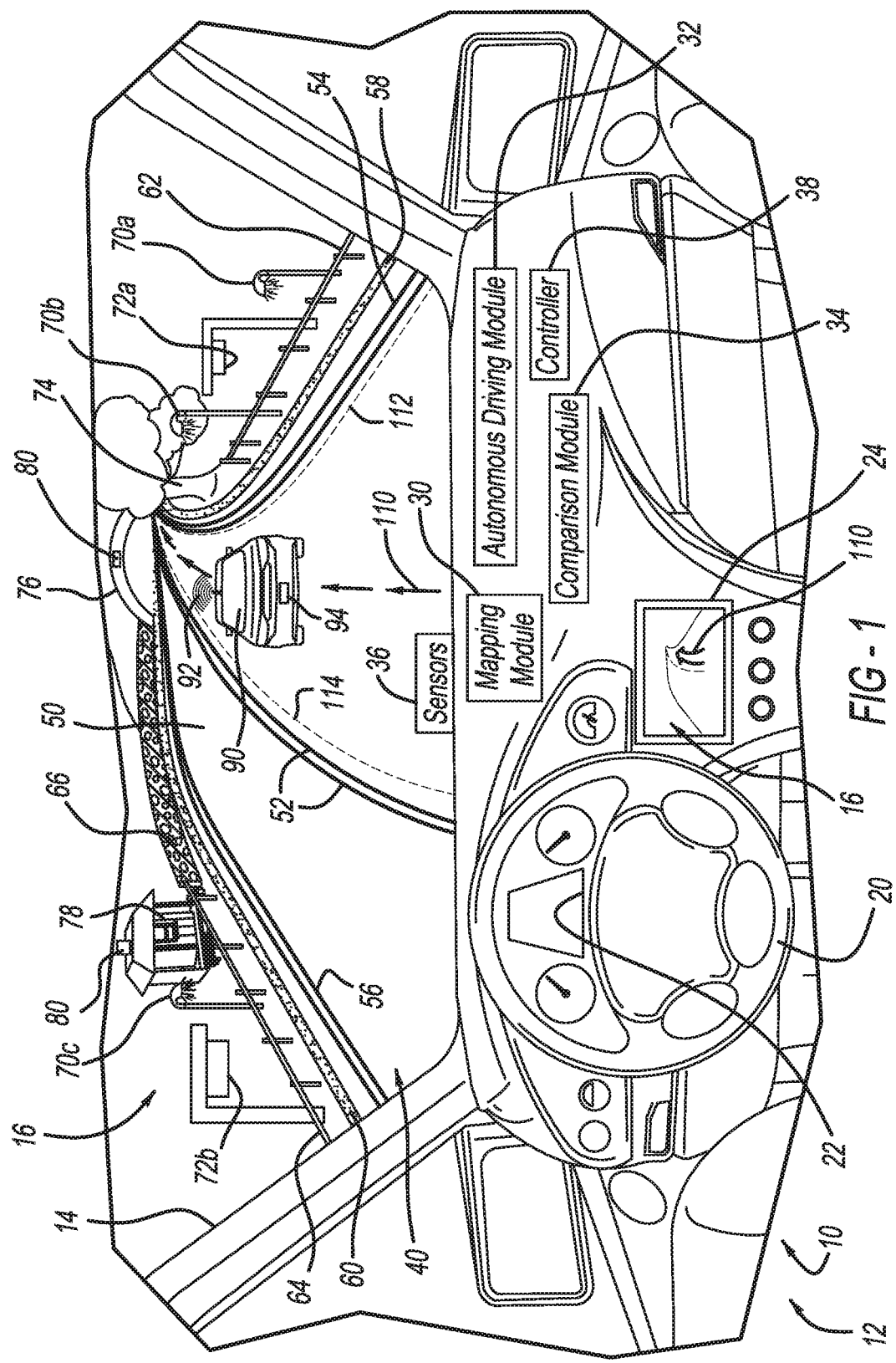
FIG. 1 illustrates a passenger cabin of a vehicle including a system according to the present teachings for displaying route information to a driver of the vehicle.
Figure 3:
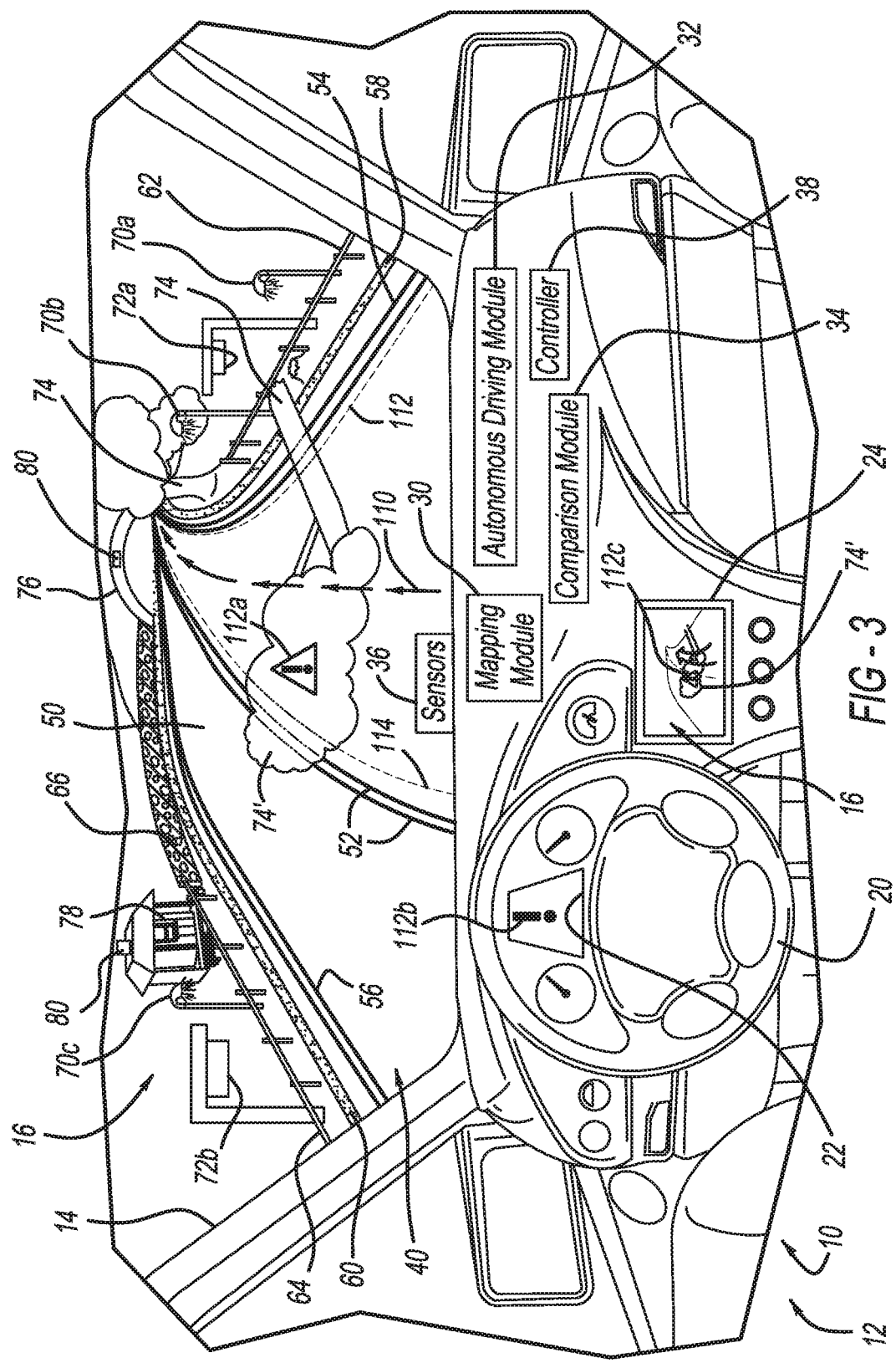
Figure 4:
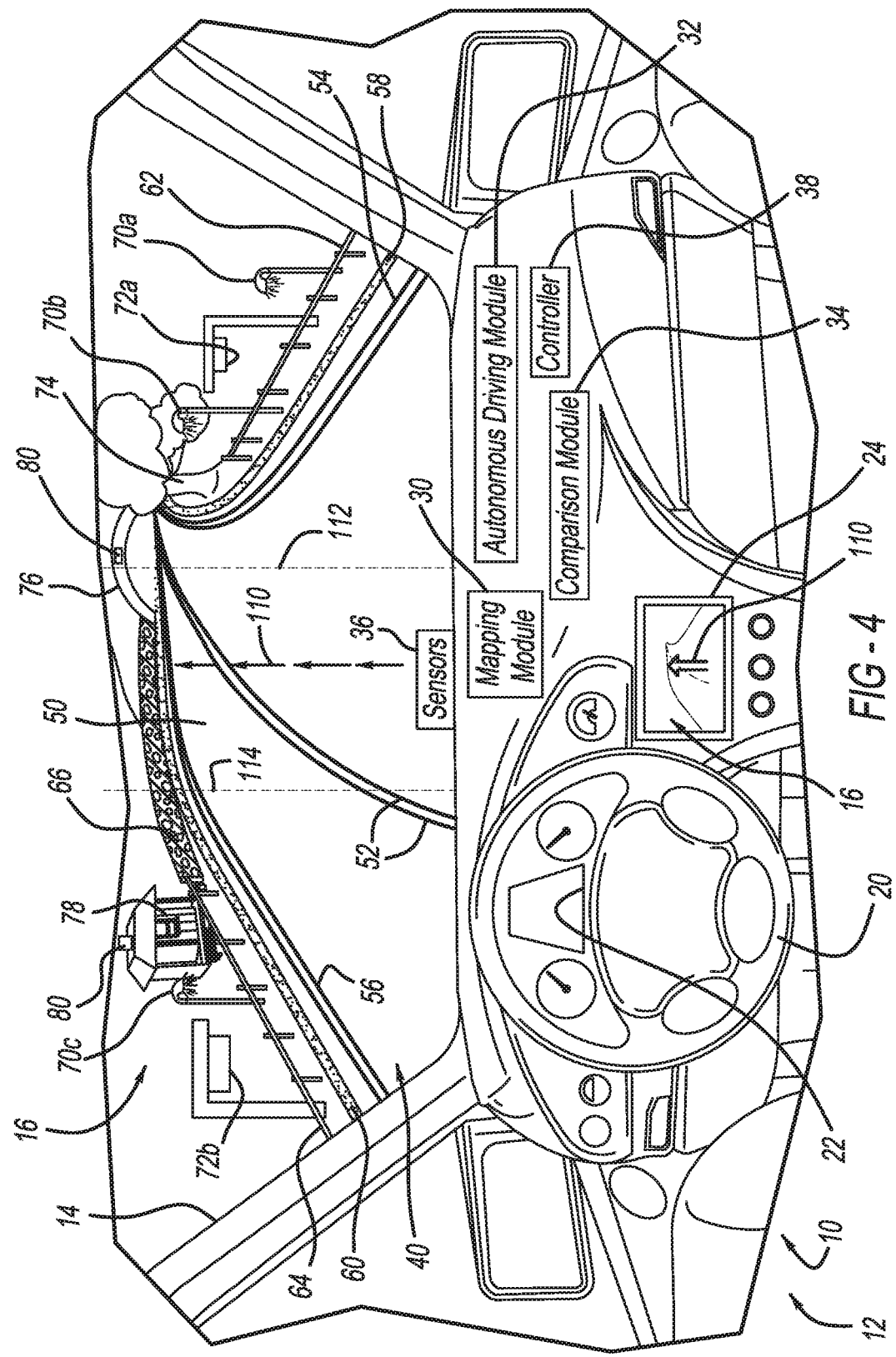

FIG. 3 is similar to FIG. 1, but shows a fallen tree blocking the roadway ahead of the vehicle, the fallen tree detected by methods and systems according to the present teachings for displaying route information to the driver of the vehicle; and FIG. 4 is similar to FIG. 1, but illustrates inconsistencies between map data being used to guide the vehicle and the environment in which the vehicle is traveling.

Corresponding reference numerals indicate corresponding parts throughout the several views of the drawings.

DETAILED DESCRIPTION

Example embodiments will now be described more fully with reference to the accompanying drawings.

With initial reference to FIG. 1, a passenger cabin 10 of a vehicle 12 including a system according to the present teachings for displaying route information to a driver of the vehicle 12 is illustrated. The vehicle 12 includes a windshield 14, through which an environment 16 in which the vehicle 12 is travelling can be viewed by the driver and other occupants of the vehicle 12. Within the passenger cabin 10 is a steering wheel 20 for steering the vehicle 12. Behind the steering wheel 20 is an instrument cluster display 22, which can be configured to display information to the driver that is relevant to operation of the vehicle 12, as explained herein. A center stack display 24 is also configured to display information to the driver that is relevant to operation of the vehicle 12. For example, the center stack display 24 can be configured to display the environment 16 in which the vehicle 12 is traveling, as captured in real-time by a camera (generally illustrated at sensor 36) mounted to the vehicle 12.

The vehicle 12 further includes a mapping module 30, an autonomous driving module 32, a comparison module 34, the sensor 36, and a controller 38. As explained further below, and as recognized by one skilled in the art, the terms "module" and "controller" may refer to, be part of, or include processor hardware (shared, dedicated, or group) that executes code and memory hardware (shared, dedicated, or group) that stores code executed by the processor hardware for performing the operations described herein.

The mapping module 30 is configured to store, receive, process, and/or display map data to the driver corresponding to the environment 16 in which the vehicle 12 is traveling, as well as process and display route information for the vehicle 12. The autonomous driving module 32 is configured to autonomously drive the vehicle 12, such as based on map and route information supplied by the mapping module 30. The comparison module 34 is configured to compare map and route data of the mapping module 30 to the environment 16 in which the vehicle 12 is traveling, and identify any inconsistencies therebetween. The comparison module 34 receives information regarding the environment 16 from the sensor 36. The sensor 36 can be any suitable sensor for sensing and detecting any suitable features and conditions of the environment 16, such as road conditions, traffic conditions, hazards, buildings and other structures, and actual direction and shape of the road 50 ahead. For example, the sensor 36 can be any suitable camera, radar, lidar, or any other suitable sensing or detection device. The mapping module 30, the autonomous driving module 32, the comparison module 34, and the sensor 36, can be controlled by a controller 38. The controller 38 can be any suitable controller, such as any suitable processing or computing device.

The mapping module 30 can include any suitable mapping data, such as three-dimensional map data. The three-dimensional map data can include the road 50 and any other suitable objects within the environment 16, and can be displayed to the driver in any suitable manner, such as with a heads-up display (HUD) 40 and/or on the center stack display 24. The map data can include anything in the environment 16, particularly anything that will facilitate identification of the road 50, or any other suitable surface for the vehicle 12 to safely travel on. For example, the road 50 can be defined by map data including a center lane marker 52, a right lane marker 54, and a left lane marker 56, and the positions of the markers 52, 54, and 56 ahead of the vehicle 12. The road 50 can be alternatively defined by, or further defined by, map data including one or more of a right curb 58, a left curb 60, a right guardrail 62, a left guardrail 64, walls 66, light posts 70a-70c, trees/foliage 74, and buildings/structures 78. Any other objects present in the environment 16 that may be useful for defining the road 50 and/or guiding the vehicle 12 generally may also be included in the map data such as barriers, gates, fences, garage doors, bridges and paved versus unpaved areas.

The location of the road 50 can also be located using vehicle-to-infrastructure and vehicle-to-vehicle communications. For example, any number of sensors or beacons 72a, 72b, and 80 may be positioned in the environment 16 to identify the location of various relevant objects and structures, as well as the road 50. For example, the beacons 72a and 72b may be arranged alongside the road 50 to define the boundaries of the road 50. In some cases, the beacons 72a and 72b can be mounted to posts including equipment for monitoring road conditions, such as traffic conditions, and/or including equipment for deducting a toll. The beacons 80 can be positioned on structures, such as tunnel 76 and building 78 to identify the locations thereof, as well as the location of the road 50. The beacons 72a, 72b, and 80 can be detected by the sensors 36 of the vehicle 12, and can emit signals unique to the structure to which they are attached. Reference numerals 72a and 72b may also represent road condition monitors configured to detect conditions of the road 50, such as traffic conditions.

The sensors 36 are also configured to detect other vehicles, such as lead vehicle 90 traveling ahead of the vehicle 12. The lead vehicle 90 may include a transmitter/receiver 92 configured to transmit it's location to the vehicle 12. The lead vehicle 90 can also transmit road and traffic conditions detected by one or more sensors 94 onboard the lead vehicle 90. The location of the lead vehicle 90, as well as traffic and road conditions detected by sensors 94 of the lead vehicle 90, can be transmitted directly to the vehicle 12 using any suitable vehicle-to-vehicle transmission communication, or relayed to the vehicle 12 using any intermediary transmission system.

Based on the map data and/or the position of the vehicle 12 relative to various objects in the environment 16 (as detected by the sensors 36 and/or the beacons 72a, 72b, 80 for example) the mapping module 30 is configured to identify the location of the road 50 and the position of the vehicle 12 relative to the road 50. The mapping module 30 is further configured to identify a planned route of the vehicle 12, such as a route entered by the operator of the vehicle. Using the HUD 40 and/or the center stack display 24, for example, the mapping module 30 is configured to generate any suitable indicator that will display to the operator the location of the road 50, and the route of the vehicle. For example and as illustrated in FIG. 1, mapping module 30 can generate for display by the HUD 40 and/or the display 24 an intended path indicator 110, as well as left and right lane indicators 112 and 114.

When the vehicle 12 is being operated in manual driving mode, the intended path indicator 110 represents the path that the operator should steer the vehicle 12 along in order to reach his/her intended destination. The intended path indicator 110 can be displayed together with, or independent of, the left and right lane indicators 112 and 114. The left and right lane indicators 112 and 114 indicate the location of the particular lane of the road 50 that the vehicle 12 is in and/or should be in to follow the planned route. The left and right lane indicators 112 and 114 can also be configured to identify the outer boundary of the road 50. The left and right lane indicators 112 and 114 are particularly helpful to inform the driver of the boundaries of the lane, or road 50 generally, when visibility is low and/or the road 50 is covered in show. Using the intended path indicator 110 and/or the left and right lane indicators 112/114, the driver can safely maintain the vehicle 12 on the road 50 even in low visibility conditions and when the boundaries of the road are obscured.

When the vehicle 12 is being operated in an autonomous driving mode, the intended path indicator 110 and the left and right lane indicators 112/114 represent the route along which the autonomous driving module 32 intends to drive the vehicle. Thus the operator of the vehicle 12 can monitor the intended route of the vehicle 12, and be reassured that the autonomous driving module 32 will be accurately and safely piloting the vehicle 12. Furthermore and as described herein, if based on the position of the intended path indicator 110 the driver disagrees with the direction in which the autonomous driving module 32 intends to pilot the vehicle 12, and/or sees an obstacle not included with the map data of the mapping module 30 and/or not detected using the sensors 36 or in any other manner, the operator may disengage the autonomous driving module 32 and manually pilot the vehicle 12.

Figure 2:
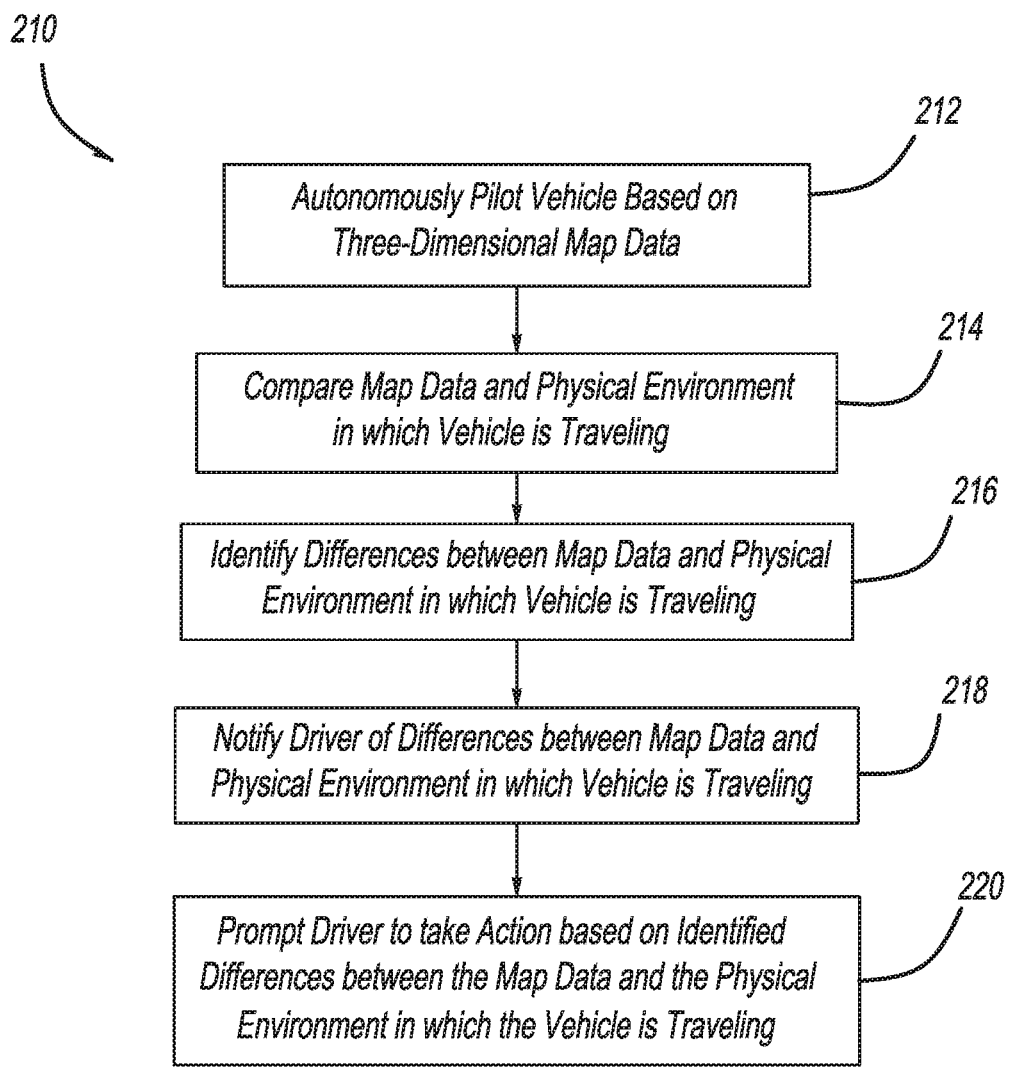
FIG. 2 illustrates a method according to the present teachings for displaying route information to a driver of the vehicle.

With continued reference to FIG. 1 and additional reference to FIG. 2, a method for displaying route information to the operator of the vehicle 12 is illustrated. With initial reference to block 212, the vehicle 12 can optionally be piloted by the autonomous driving module 32 based on three-dimensional map data supplied by the mapping module 30. The vehicle 12 can be autonomously piloted solely based on the three-dimensional map data, or based on the three-dimensional map data in combination with other data, such as real-time data gathered from the environment 16 using the sensors 36, vehicle-to-vehicle communication, or vehicle-to-infrastructure communication as described above. Because the vehicle 12 can also be manually driven, block 212 is optional.

At block 214, the comparison module 34 compares the map data from the mapping module 30 with the environment 16 in which the vehicle 12 is traveling. The environment 16 is sensed in any suitable manner, such as with one or more of the sensors 36, which are configured to sense various features of the environment 16 as described above, such as the location of the road 50, surrounding vehicles 90, and any other structures or foliage about the road, such as buildings 78, tunnels 76, light posts 70a-70c, and trees 74. At block 216, the comparison module 34 identifies differences between the map data and the physical environment 16 in which the vehicle 12 is traveling.

At block 218, differences between the map data and physical environment 16 in which the vehicle 12 is traveling are displayed to the driver in any suitable manner, such as with the HUD 40 and/or the center stack display 24. For example and with reference to FIG. 3, if the sensor 36 identifies that the tree 74 has fallen and a portion 74' of the tree 74 is blocking the road 50, the controller 38 will generate a warning, such as any suitable visual, audible, or haptic feedback warning to the operator in order to alert the operator of this discrepancy and possible hazard. In the example illustrated in FIG. 3, the warning is a visual warning 112a displayed on the HUD 40, a visual warning 112*b* displayed on the instrument cluster display 22, and a visual warning 112*c* displayed on the center stack display 24.

If the vehicle 12 is being operated manually, the operator can then take evasive action to avoid the hazard. If the vehicle 12 is being driven autonomously, the mapping module 30 can formulate an alternate route for the autonomous driving module 32 to follow. The new route can be displayed to the driver using the intended path indicator 110. For example and with reference to FIG. 3, rather than extend through the fallen portion 74' of the tree 74, the intended path indicator 110 can curve around the fallen portion 74' to indicate that the autonomous driving module 32 will drive the vehicle 12 around the fallen portion 74'. If the operator is not satisfied with the new route, or if a new route is not provided (as is the case in FIG. 3), he/she can take deactivate the autonomous driving module 32 and take manual control of the vehicle 12 to steer the vehicle 12 to avoid the fallen portion 74', as illustrated at block 220 for example.

FIG. 4 illustrates a situation where the intended path 110 and the left and right lane indicators 112/114 indicate that the autonomous driving module 32 intends to drive the vehicle 12 straight ahead, even though the road 50 curves to the right. This can be due to a number of factors, such as incorrect/out-of-date map data present in the mapping module 30. Seeing this discrepancy, the operator of the vehicle 12 can take manual control of the vehicle 12 when the vehicle is being driven autonomously in order to accurately steer the vehicle 12.

Alternatively, the vehicle 12 can be kept in the autonomous driving mode and the discrepancy can be detected by the sensors 36, or in any other suitable manner. For example, the sensors 36 can identify the actual shape of the road based on one or more of the following: the location of the lane markers 52, 54, and 56; the direction of travel of lead vehicles 90; and the location of structures about the road 50, such as curbs 58, 60, guardrails 62, 64, walls 66, trees 74, buildings 78, etc. Sensors or beacons 72*a*, 72*b*, and 80, and lead vehicle 90, may also emit signals identifying the location of the road 50. The comparison module 34 can compare the map data of the mapping module 30 to the position of the road 50 as detected by the sensors 36, beacons 72*a*, 72*b*, and 80, lead vehicles 90, etc. to arrive at the actual shape of the road 50. The controller 38 and/or the mapping module 30 can then modify the intended path indicator 110 and/or the left and right lane indicators 112/114 to be arranged along the actual shape of the road 50. If the modified position of the intended path indicator 110 and/or the left and right lane indicators 112/114 still fails to correspond to the actual shape of the road 50, the operator can disengage the autonomous driving module 32 and manually steer the vehicle 12 to follow the road 50.

In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The terms "module" and "controller" are used synonymously in this application, unless based on the particular context of use one skilled in the art would recognize that different meanings should be assigned to the terms.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A method for displaying route information to a driver of a vehicle comprising:
    comparing map data and a physical environment in which the vehicle is traveling;
    identifying differences between the map data and the physical environment in which the vehicle is traveling; and
    notifying the driver of the differences between the map data and the physical environment in which the vehicle is traveling; wherein
    the map data is three-dimensional map data.

2. The method of claim 1, further comprising displaying the comparison of map data and the physical environment in which the vehicle is traveling by projecting the map data on a heads-up display (HUD) of the vehicle.

3. The method of claim 1, further comprising displaying the comparison of map data and the physical environment in which the vehicle is traveling on a monitor within the vehicle showing the map data overlaid on a live camera image of the physical environment.

4. The method of claim 1, wherein the map data includes at least one of road lane markers, guard rails, barriers, walls, traffic, light poles, gates, fences, garage doors, and toll booths.

5. The method of claim 1, further comprising identifying differences between the map data and the physical environment by comparing the map data to the physical environment sensed using at least one of the following: sensors onboard the vehicle, sensors onboard other vehicles, sensors on infrastructure, sensors on buildings, sensors on obstacles, travel paths of surrounding vehicles, traffic reports, and traffic sensors.

6. The method of claim 5, wherein the sensors include at least one of a camera, radar, and lidar.

7. The method of claim 1, further comprising identifying differences between the map data and the physical environment by comparing the map data to the physical environment sensed by sensors of surrounding vehicles and communicated to the driver's vehicle using vehicle-to-vehicle communication.

8. The method of claim 1, further comprising identifying differences between the map data and the physical environment by comparing the map data to the physical environment sensed by sensors of infrastructure of the physical environment and communicated to the driver's vehicle using vehicle-to-infrastructure communication.

9. The method of claim 1, further comprising autonomously driving the vehicle based solely on the map data.

10. The method of claim 9, further comprising autonomously directing the vehicle to take evasive action when the map data does not match the physical environment.

11. A method for displaying route information to a driver of a vehicle comprising:
    autonomously piloting the vehicle based on map data; and
    displaying to the driver a comparison of the map data and a physical environment in which the vehicle is traveling.

12. The method of claim 11, further comprising:
    identifying differences between the map data and the physical environment in which the vehicle is traveling;
    notifying the driver of the differences between the map data and the physical environment in which the vehicle is traveling; and
    prompting the driver to take manual control of the vehicle based on identified differences between the map data and the physical environment in which the vehicle is traveling;
    wherein the map data is three-dimensional map data.

13. The method of claim 11, wherein the map data includes lane markers, buildings, guardrails, light posts, tunnels, walls, and bridges overlaid on the physical environment using at least one of a heads-up-display and a monitor displaying a camera image of the physical environment.

14. The method of claim 11, further comprising identifying differences between the map data and the physical environment by comparing the map data to the physical environment sensed using at least one of the following: sensors onboard the vehicle; sensors onboard other vehicles; sensors on infrastructure; sensors on obstacles; travel paths of surrounding vehicles; traffic reports; traffic sensors; sensors of surrounding vehicles and communicated to the driver's vehicle using vehicle-to-vehicle communication; sensors of infrastructure of the physical environment and communicated to the driver's vehicle using vehicle-to-infrastructure communication;
    wherein the sensors include at least one of a camera, radar, and lidar.

15. A system for displaying route information to a driver of a vehicle comprising:
    an autonomous driving module configured to pilot the vehicle using three-dimensional map data only;
    at least one sensor configured to detect features of the physical environment in which the vehicle is traveling;
    a comparison module configured to compare the map data and the features detected by the sensor of the physical environment in which the vehicle is traveling, and identify differences between the map data and the physical environment; and
    a display configured to display the map data relative to the physical environment in which the vehicle is traveling and differences between the map data and the physical environment.

16. The system of claim 15, wherein the at least one sensor includes at least one of the following: sensors onboard the vehicle; sensors onboard other vehicles; sensors on infrastructure; and sensors on obstacles;
    wherein the at least one sensor includes at least one of a camera, radar, and lidar.

17. The system of claim 15, wherein the comparison module is further configured to compare the map data with at least one of the following: travel paths of surrounding vehicles; traffic reports; and traffic sensors.

18. The system of claim 15, wherein:
    the comparison module is further configured to compare the map data to the physical environment sensed by sensors of infrastructure of the physical environment and communicated to the driver's vehicle using vehicle-to-infrastructure communication; and
    the comparison module is further configured to compare the map data to the physical environment sensed by sensors of surrounding vehicles and communicated to the driver's vehicle using vehicle-to-vehicle communication.

19. The system of claim 15, wherein:
    the comparison module is further configured to compare the map data to road shape defined by at least one of the following: surrounding structures; lane markers; travel path of at least one leading vehicle; trees; road curb; and paved versus unpaved areas.

* * * * *